(12) United States Patent
Uehara et al.

(10) Patent No.: US 6,626,552 B2
(45) Date of Patent: Sep. 30, 2003

(54) MOBILE INFORMATION TERMINAL

(75) Inventors: Hisao Uehara, Gifu (JP); Yasushi Marushita, Gifu (JP); Makoto Shimizu, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/119,361

(22) Filed: Apr. 9, 2002

(65) Prior Publication Data

US 2002/0145862 A1 Oct. 10, 2002

(30) Foreign Application Priority Data

Apr. 10, 2001 (JP) .......................................... 2001-111619

(51) Int. Cl.⁷ .............................................. F21V 33/00
(52) U.S. Cl. ........................... 362/85; 362/561; 362/31
(58) Field of Search ......................... 362/85, 109, 253, 362/561, 223, 31

(56) References Cited

U.S. PATENT DOCUMENTS 6,222,724 B1 * 4/2001 Howell et al. .............. 361/681
6,273,577 B1 * 8/2001 Goto et al. .................... 362/31

* cited by examiner

*Primary Examiner*—Sandra O'Shea
*Assistant Examiner*—Guiyoung Lee
(74) *Attorney, Agent, or Firm*—Fish & Richardson P.C.

(57) ABSTRACT

External light is introduced by a light-introducing portion to be used as a light source for a backlight, so that the power consumption of the backlight of a liquid crystal display device can be suppressed. At the same time, the brightness of the screen of the liquid crystal display device can be increased to enhance the visibility in outdoors. Therefore, the portability of a mobile information terminal can be improved. Furthermore, the light-introducing portion covers an end portion of the main unit opposed to an axis, whereby the main unit is protected so that the life period of the mobile information terminal can be prolonged. The variety of the design of the mobile information terminal can be increased by using the transparency of the light-introducing portion.

15 Claims, 4 Drawing Sheets

MOBILE INFORMATION TERMINAL

BACKGROUND OF THE INVENTION

1. Field of the Invention

The present invention relates to a mobile information terminal having a cover which serves also as a liquid crystal display device.

2. Description of the Related Art

Recently, as typified by a notebook-type personal computer, a mobile information terminal which uses an electric power charged in an internal battery so as to be operable without using a power cord and portable is becoming pervasive. In many mobile information terminals, mounted is a transmission liquid crystal display device which uses light emitted from a backlight. In order to improve the portability of a mobile information terminal, a battery is requested to have a long life period, and also to be light in weight.

FIG. 7 is a side view of a notebook-type personal computer of the conventional art. The notebook-type personal computer 1 has a configuration in which a cover 3 is connected to the main unit 2 via an axis 4 so that the cover 3 is movable.

First, the main unit 2 has a processing unit (not shown) such as a CPU, and a controlling unit (not shown) in a case. An input device 5 such as a keyboard is disposed on the surface of the main unit. The axis 4 for connecting the cover 3 is placed in one end portion of the main unit 2.

Next, the cover 3 is connected to the main unit 2 via the axis 4 disposed in an end portion 13, and has a liquid crystal display device 8 disposed in an outer case 12. The liquid crystal display device 8 is configured by a liquid crystal panel 14 and a backlight 15. The display screen of the liquid crystal panel 14 is exposed from the outer case 12 so as to be seen. The backlight 15 is placed on the rear face of the liquid crystal panel 14 to illuminate the liquid crystal panel 14 from the rear side. The liquid crystal panel 14 controls the transmission of the light of the backlight 15 to display an image. The backlight 15 is exposed from the outer case 12 so that the exposed portion functions as a light-introducing portion 30. The light-introducing portion 30 introduces external light such as sunlight or roomlight. The introduced external light can be used as light with which the backlight 15 illuminates the liquid crystal panel 14. The main unit 2 and the cover 3 are provided with a lock mechanism 6. The lock mechanism 6 is configured by a knob portion 6a, a hook portion 6b, and a hook hole so as to fix the main unit 2 and the cover 3 together when the cover 3 is closed. When the knob portion 6a is moved toward an end portion 9, the hook portion 6b is moved to be disengaged from the hook hole which is formed in a position of the cover 3 corresponding to the hook portion 6b, thereby allowing the cover 3 to be opened.

Next, the liquid crystal display device 8 will be described in detail. FIG. 8 is a section view of the cover 3. The liquid crystal display device 8 is positioned in the outer case 12, and configured by the liquid crystal panel 14 and the backlight 15. The liquid crystal panel 14 has a configuration in which a liquid crystal layer 21 is interposed between two substrates 23 made of a transparent insulative material such as glass. A polarizing plate 22 is disposed on the outside of each of the substrates 23. The polarizing plates 22 are placed so that their polarizing axes are perpendicular or parallel to each other. In the liquid crystal layer 21, the initial alignment of liquid crystal molecules (not shown) is determined by an alignment film. A voltage is applied across transparent electrodes (not shown) on the glass substrates 23 to change the alignment of the liquid crystal molecules in the liquid crystal layer 21, whereby the light transmittance is changed. As a result, the liquid crystal panel 14 can display an image.

The backlight 15 is configured by a light guide plate 26, a light source 27, a reflector plate 28, a diffusion plate 29, and a lens sheet (not shown). The light source 27 is a light source consisting of, for example, a cold cathode tube. The light guide plate 26 is made of a transparent resin such as an acrylic resin, and guides light emitted from the light source 27. An end portion of the light guide plate 26 which is opposed to the light source 27 is formed as the light-introducing portion 30 which is exposed from the outer case 12. The light-introducing portion 30 introduces external light such as sunlight or roomlight into the light guide plate 26. The light introduced into the light-introducing portion 30 is used as a light source in place of or auxiliary to the light source 27, so that it is reflected by the reflector plate 28 in the direction to the diffusion plate 29, formed into a surface light source by the diffusion plate 29, converged by the lens sheet (not shown), and then emitted from an illumination surface of the light guide plate 26 to impinge on the liquid crystal panel 14. When the external light is used as a light source in place of the light source 27, the power consumption of the light source 27 can be reduced. When the external light is used as a light source auxiliary to the light source 27, the brightness of the liquid crystal panel 14 can be enhanced so that the visibility of the liquid crystal panel 14 can be improved.

In the transmission liquid crystal display device which uses only the internal light source 27, the power consumed by the light source 27 amounts to 60 to 70% of the power consumption of the liquid crystal display device. As a result, the life period of the battery which supplies the power to the mobile information terminal is shortened, and hence the mobile information terminal cannot be carried for a long time period. When the size of a battery pack is increased in order to prolong the life period of the battery, the weight of the whole mobile information terminal is correspondingly increased to impair the portability of the terminal. Since the brightness of the backlight is lower than the brightness (illuminance) of external light, moreover, the visibility of the liquid crystal display device in outdoors is poor, thereby further impairing the portability of the mobile information terminal. In the above-mentioned mobile information terminal, the power consumption of the backlight 15 can be reduced by disposing the light-introducing portion 30, but the exposed area of the light-introducing portion 30 is small, thereby causing a problem in that the amount of external light which can be introduced is limited. In accordance with the recent tendency of thinning a notebook-type personal computer, particularly, also the light-introducing portion 30 must be further thinned. Therefore, the size of the light-introducing portion 30 is further reduced.

SUMMARY OF THE INVENTION

The invention has been conducted in order to solve the problems. It is an object of the invention to reduce the power consumption of a backlight and improve the visibility in outdoors, thereby improving the portability of a mobile information terminal.

The invention has been conducted in order to attain the object, and provides a mobile information terminal having a cover comprising: a liquid crystal panel; and a light-introducing portion which introduces external light to illuminate the liquid crystal panel, the cover being connected to a main unit by at least one axis to be movable, wherein one end of the cover including the light-introducing portion has a shape which, when the cover is closed and swung to a position where the cover overlaps with the main unit, covers an area of an end portion of the main unit opposed to the axis, the area extending from an upper face to a side face.

Furthermore, a mobile information terminal is provided in which the light-introducing portion is disposed in an end portion opposed to the axis, a length of the cover between the light-introducing portion and the axis is longer than a length of the main unit between an end portion opposed to the light-introducing portion and the axis, and a thickness of the cover in a position of the light-introducing portion is larger than a thickness of the cover in a position of the liquid crystal panel.

Furthermore, a mobile information terminal is provided in which a length of the cover between the light-introducing portion and the axis is longer than a length of the main unit between an end portion opposed to the light-introducing portion and the axis, and an end portion of the cover including the light-introducing portion has a shape which covers an end portion of the main unit opposed to the axis and extending from an upper face to a side face.

In these mobile information terminals, the end portion of the main unit opposed to the light-introducing portion is formed as a face inclined with respect to a bottom face of the main unit, and the light-introducing portion has a shape corresponding to the inclined face.

DETAILED DESCRIPTION OF THE PREFERRED EMBODIMENTS

Hereinafter, the mobile information terminal of the invention will be described with taking a notebook-type personal computer as an example.

Figure 1:
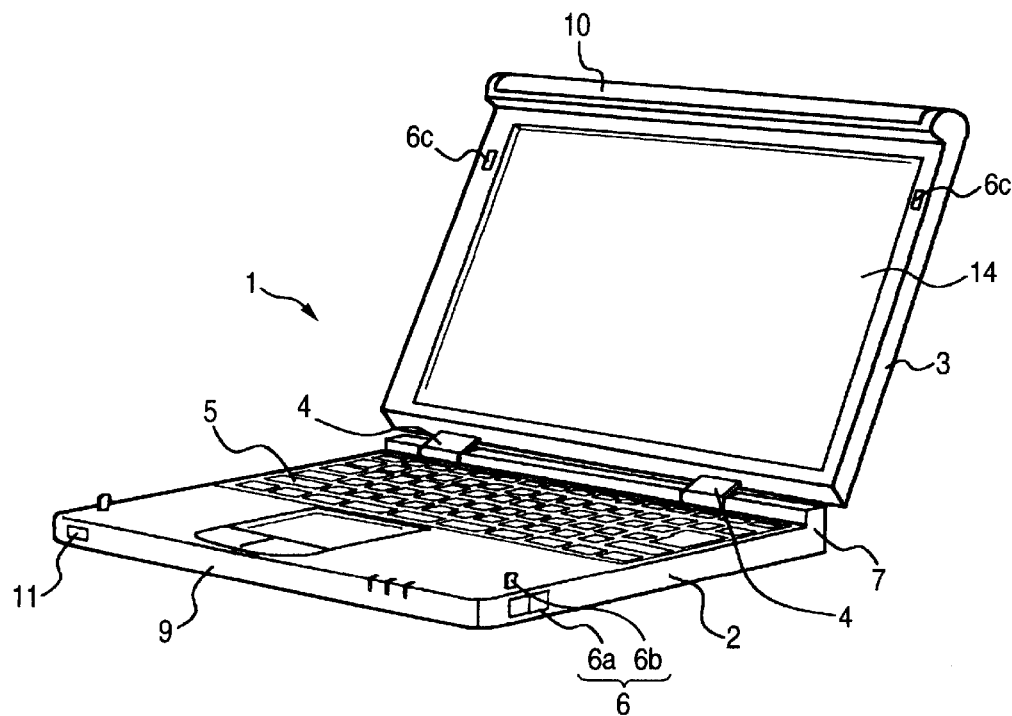
FIG. 1 is a perspective view of a notebook-type personal computer which is a first embodiment of the invention.
Figure 2:
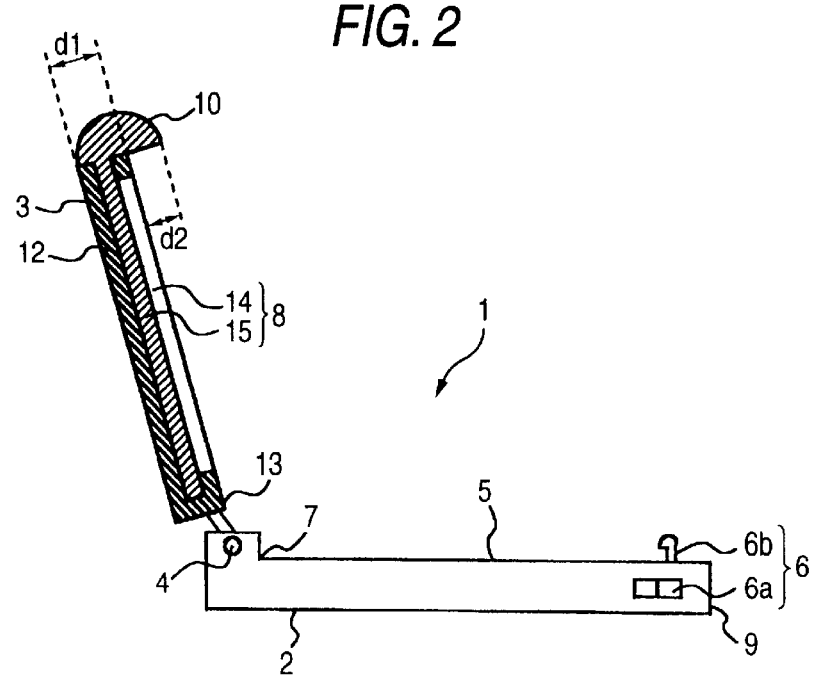
FIG. 2 is a side view showing a state where a cover of the notebook-type personal computer of the first embodiment of the invention is opened.
Figure 3:
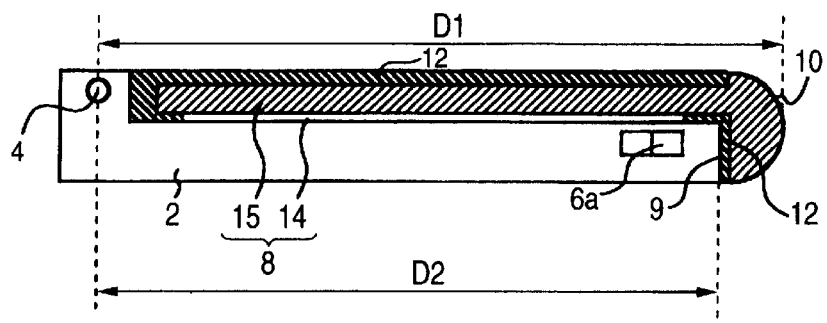
FIG. 3 is a side view showing a state where the cover of the notebook-type personal computer of the first embodiment of the invention is closed.

FIG. 1 is a perspective view of a notebook-type personal computer which is a first embodiment of the invention, and FIGS. 2 and 3 are side views respectively showing states where a cover is opened, and where the cover is closed. The notebook-type personal computer 1 has a configuration in which a cover 3 is connected to the main unit 2 via an axis 4 so that the cover 3 is movable.

First, the main unit 2 has a processing unit (not shown) such as a CPU, and a controlling unit (not shown) in a case molded of an ABS resin, a magnesium alloy, or the like. An input device 5 such as a keyboard, and a lock mechanism 6 are disposed on the surface of the main unit. The axis 4 is placed in an end portion 7.

The cover 3 has a liquid crystal display device 8 disposed in an outer case 12, and is connected in an end portion 13 to the axis 4. The outer case 12 is molded of an ABS resin, a magnesium alloy, or the like, and has a shape which covers the liquid crystal display device 8. In order to prevent the scenery on the rear side of the cover 3 from being seen through a liquid crystal panel 14, the outer case 12 blocks light from the rear side of the cover 3, and is larger at least than the liquid crystal panel 14 so as to cover the whole of the rear side and the outer periphery of the liquid crystal panel 14. The liquid crystal display device 8 is configured by the liquid crystal panel 14 and a backlight 15. The display screen which is on the surface of the liquid crystal panel 14 is exposed from the outer case 12. The liquid crystal panel 14 controls the transmission of the light of the backlight 15 to display an image. The backlight 15 is placed on the rear face of the liquid crystal panel 14 to illuminate the liquid crystal panel 14 from the rear side. The backlight 15 is exposed from the outer case 12 so that the exposed portion functions as a light-introducing portion 10. The light-introducing portion 10 introduces external light such as sunlight or roomlight. The introduced external light can be used as light with which the backlight 15 illuminates the liquid crystal panel 14.

The characteristic feature of the embodiment is that the light-introducing portion 10 is projected by d2 in the closing direction from the thickness d1 of the cover 3. In the notebook-type personal computer 1 of the conventional art, the thickness of the light-introducing portion 30 is not larger than the thickness d1 of the cover 3. By contrast, the notebook-type personal computer 1 of the embodiment has the light-introducing portion 10 which is projected by d2 in the closing direction from the thickness d1 of the cover 3. As compared with the light-introducing portion 30 in the conventional art, therefore, the portion which introduces external light can be enlarged and the amount of introduced external light can be increased.

The distance D1 of the cover 3 from the position of the axis 4 to the light-introducing portion 10 is set to be larger than the distance D2 of the main unit 2 from the axis 4 to the end portion 9. Therefore, the light-introducing portion 10 has a shape which, when the cover 3 is closed, covers the end portion 9 of the cover 3 as shown in FIG. 3. Although the light-introducing portion 10 is projected in the closing direction, consequently, the thickness of the notebook-type personal computer 1 in the case where the cover 3 is closed is equal to that in the conventional art, and hence the portability is not impaired.

The lock mechanism 6 is configured by a knob portion 6a and a hook portion 6b which are disposed on the main unit 2, and a hook hole 6c which is formed in the cover 3, so as to fix the main unit 2 and the cover 3 together when the cover 3 is closed. When the knob portion 6a is moved toward the end portion 9, the hook portion 6b is moved to be disengaged from the hook hole 6c which is formed in a position of the cover 3 corresponding to the hook portion 6b, thereby allowing the cover 3 to be opened. When the lock mechanism 6 is disposed in the end portion of the cover 3 where the light-introducing portion 10 is placed, or in the end portion 9 of the main unit 2 which is to overlap with the light-introducing portion 10, external light introduced into the corresponding part of the light-introducing portion 10 is blocked and the light introduction is impeded. Therefore, the lock mechanism 6 is preferably disposed in both the side edges which are not opposed to the axis 4.

Figure 4:
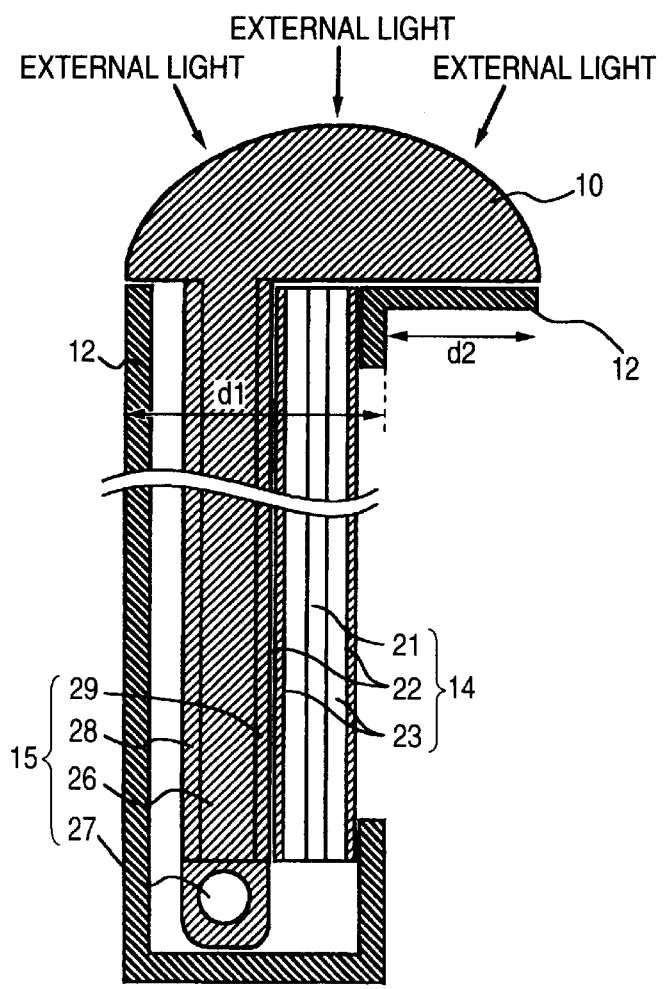
FIG. 4 is a section view of the cover of the notebook-type personal computer of the first embodiment of the invention.

Next, the liquid crystal display device 8 will be described. FIG. 4 is a section view of the cover 3. The liquid crystal display device 8 is positioned in the outer case 12 and configured by the liquid crystal panel 14 and the backlight 15. The liquid crystal panel 14 has a configuration in which a liquid crystal layer 21 is interposed between two substrates 23 made of a transparent insulative material such as glass. In the liquid crystal layer 21, the initial alignment of liquid crystal molecules (not shown) is determined by an alignment film. A voltage is applied across transparent electrodes (not shown) on the glass substrates 23 to change the alignment of the liquid crystal molecules in the liquid crystal layer 21, whereby the light transmittance is changed. As a result, the liquid crystal panel 14 can display an image.

The backlight 15 is configured by a light guide plate 26, a light source 27, a reflector plate 28, a diffusion plate 29, and a lens sheet (not shown). The light source 27 consists of a cold cathode tube, white LEDs, or the like, and is placed in one end portion of the light guide plate 26. The light guide plate 26 is formed by resin molding using a die, and, in order to irradiate the liquid crystal panel 14 with light in the form of a surface light source, has a larger area than the liquid crystal panel 14 and is placed so as to overlap with the entire display screen of the liquid crystal panel 14. Another end portion of the light guide plate 26 which is opposed to the light source 27 is formed as the light-introducing portion 10 which is exposed from the outer case 12. The light-introducing portion 10 introduces external light such as sunlight or roomlight into the light guide plate 26. The light introduced into the light-introducing portion 10 is used as a light source in place of the light source 27, so that it is reflected by the reflector plate 28 in the direction to the diffusion plate 29, formed into a surface light source by the diffusion plate 29, converged by the lens sheet (not shown), and then emitted from an illumination surface of the light guide plate 26 to impinge on the liquid crystal panel 14. When the external light is used as a light source in place of the light source 27, the power consumption of the light source 27 can be reduced. When the external light is used as a light source auxiliary to the light source 27, the brightness of the liquid crystal panel 14 can be enhanced so that the visibility of the liquid crystal panel 14 can be improved.

The characteristic feature of the embodiment is that the cover 3 has a shape in which a major portion of the cover 3 has the thickness d1 and, in the position of the light-introducing portion 10, the light-introducing portion 10 is projected by the thickness d2 of the main unit 2 in the direction to the main unit 2. As shown in FIG. 3, the light-introducing portion 10 has a shape which, when the cover 3 is closed, covers the area of the end portion 9 of the main unit 2 extending from the upper face to the side face. According to this shape, the thickness d2 of the light-introducing portion 10 can be made larger than the thickness d1 of the cover 3. Namely, the exposed area of the light-introducing portion 10 can be enlarged and the amount of introduced external light can be increased. When the cover 3 is closed, moreover, the light-introducing portion 10 plays a role of protecting the end portion 9 of the main unit 2.

In the embodiment, the light-introducing portion 10 has a semicylindrical shape, or a cylindrical lens-like shape, so that, when the cover 3 is opened, oblique external light can be efficiently introduced from the upper side. The light-introducing portion 10 is not restricted to have the above-mentioned shape, and may have any shape as far as the external-light introduction face is directed upward when the cover 3 is opened. For example, the light-introducing portion may have a polygonal shape such as a triangular prism. As far as the transparency is not lowered, the light-introducing portion 10 may have any shape which corresponds to the design of the cover 3 and in turn the notebook-type personal computer 1.

As the material of the light guide plate 26 including the light-introducing portion 10, a transparent material, for example a resin such as an acrylic resin or a polycarbonate resin is used. The light guide plate 26 is shaped into a plane-parallel plate or a plate having a wedge-like section shape, and usually has a thickness of about 1 to 5 mm.

As shown in FIG. 4, the outer case 12 is formed so as to cover a side face of the projected part of the light-introducing portion 10 which faces the liquid crystal panel 14. According to the configuration, light entering the projected part of the light-introducing portion 10 is prevented from passing through the light-introducing portion 10 and then impinging on the display screen of the liquid crystal panel 14.

For example, a main switch 11 for actuating the mobile information terminal is placed on the side face 9 of the main unit 2. When the cover 3 is closed, the light-introducing portion 10 covers the main switch 11. Even when the mobile information terminal 1 is powered off and carried in a bag or the like, therefore, the main switch 11 is not erroneously operated. A component placed on the side face 9 is not restricted to the main switch 11, and various operation switches may be placed on the side face. Terminals for connecting external devices such as a mouse may be additionally placed on the side face.

Figure 5:
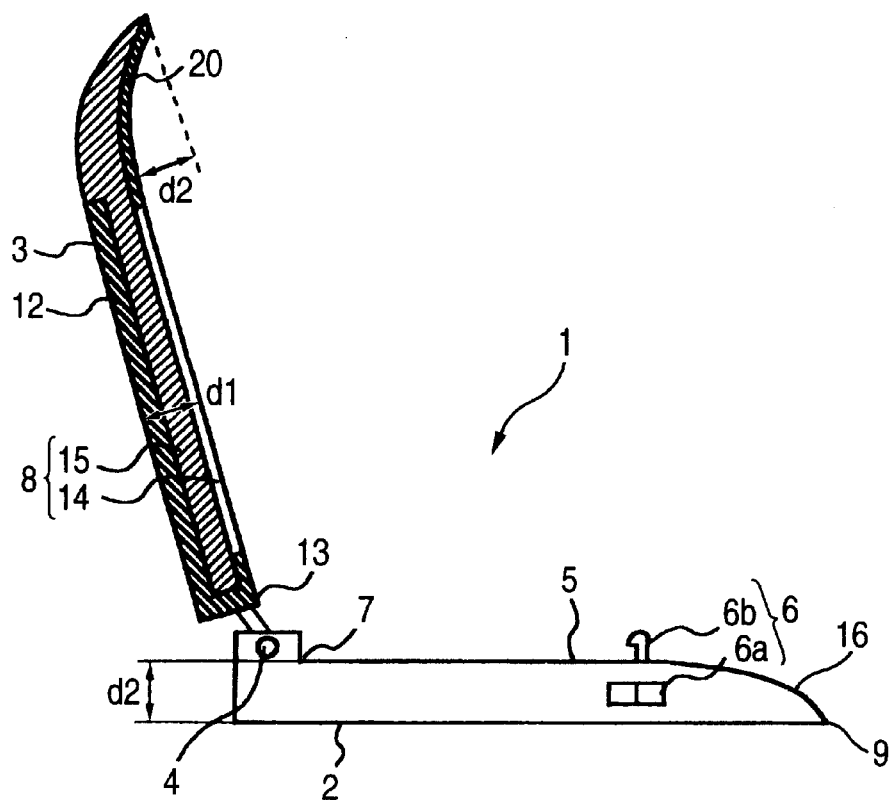
FIG. 5 is a side view showing a state where a cover of a notebook-type personal computer of a second embodiment of the invention is opened.
Figure 6:
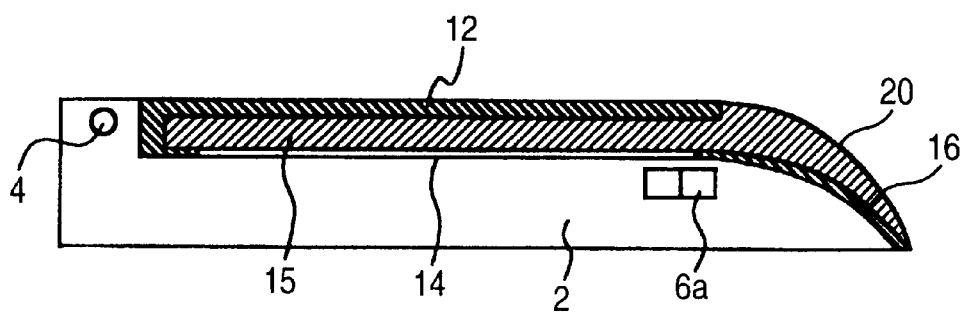
FIG. 6 is a side view showing a state where the cover of the notebook-type personal computer of the second embodiment of the invention is closed.
Figure 7:
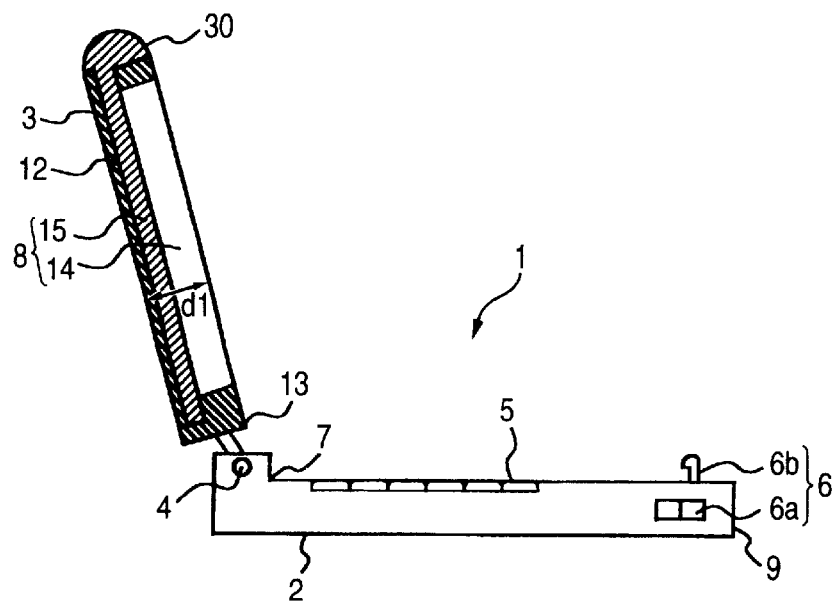
FIG. 7 is a side view showing a state where a cover of a notebook-type personal computer of the conventional art is opened.
Figure 8:
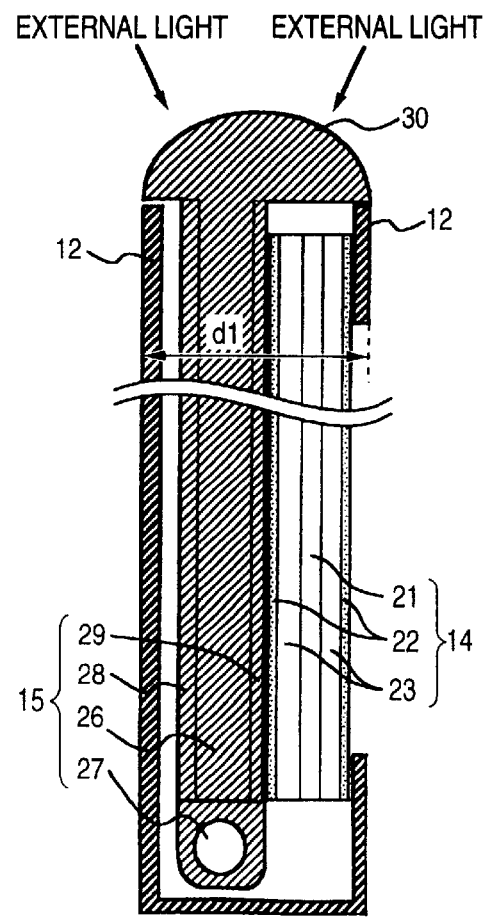
FIG. 8 is a section view showing a state where the cover of the notebook-type personal computer of the conventional art.

In the invention, it is requested that the light-introducing portion 10 is formed to be thicker than the thickness d1 of the cover 3, and various embodiments other than the embodiment described above may be made. For example, the main unit 2 may have a face which is gently continuously inclined over a range from the upper face to the side face. FIGS. 5 and 6 are side views of the notebook-type personal computer 1 which is a second embodiment of the invention. FIG. 5 shows a state where the cover 3 is opened, and FIG. 6 shows a state where the cover 3 is closed. The components which are identical with those of the first embodiment are denoted by the same reference numerals, and their description is omitted.

In the embodiment, the end portion 9 of the main unit 2 is formed as a gently inclined face 16, and the boundary between the upper and lower faces is not clear. The inclined face 16 serves as a palm rest on which, when the user operates the notebook-type personal computer 1, the hands of the user are to be placed. The palm rest can improve the operability of the input device 5 such as a keyboard.

A light-introducing portion 20 has a shape which corresponds to the inclined face 16 so that, when the cover 3 is closed, the light-introducing portion overlaps with the inclined face 16. In the same manner as the first embodiment, the light-introducing portion has a shape which is projected by d2 from the thickness d1 of the cover 3, and which, when the cover 3 is closed, cover the gently inclined face of the main unit 2 extending from the upper face to the side face as shown in FIG. 6. The area of the light-introducing portion 20 is larger than that of the light-introducing portion 10 in the first embodiment, and hence a larger amount of external light can be introduced. The light-introducing portion 20 has a curved shape. When the cover 3 is opened, upper external light can be most efficiently introduced, and oblique external light also can be efficiently introduced. The inclined face 16 and the light-introducing portion 20 are not restricted to have a curved shape, and may have any shape as far as the external-light introduction face is directed upward when the cover 3 is opened. For example, the face and the light-introducing portion may have a polygonal shape.

The invention may be applied to a mobile information terminal of another kind. In the invention, "covers an area of the main unit extending from an upper face to a side face" means not only covering of the entire upper and side faces of the main unit, but also that of a part of the upper and side faces.

External light which is introduced by a light guide plate having a light-introducing portion is used as a light source for a backlight, and the power consumption of the backlight of a liquid crystal display device is suppressed to prolong the life period of a battery, whereby the portability of the mobile information terminal can be improved. Furthermore, the external light introduced into the light-introducing portion is used as an auxiliary light source to enhance the brightness of the liquid crystal display device and improve the visibility in outdoors, so that the portability of the mobile information terminal can be further enhanced. Since the light-introducing portion covers the end portion of the main unit opposed to the axis, the main unit is protected so that the life period of the mobile information terminal can be prolonged. When a button is placed in the end portion, an erroneous operation is prevented from occurring in the case where the terminal is carried while the cover is closed. The variety of the design of the mobile information terminal can be increased by using the transparency of the light-introducing portion.

When an inclined face is disposed in the end portion of the main unit opposed to the axis and the overlapping portion which corresponds to an inclined face of the cover is used as the light guide plate, the light-introducing portion can be expanded. When the angle of the inclined face is reduced, a palm rest on which, when the user operates the terminal, the hands of the user are to be placed can be formed on the main unit to enhance the operability of an input device such as a keyboard.

What is claimed is:

1. A mobile information terminal comprising:
   a main unit;
   a liquid crystal panel;
   a light-introducing portion for introducing external light to illuminate said liquid crystal panel; and
   a movable cover connected to said main unit by at least one axis,
   wherein one end of said cover including said light-introducing portion has a shape which, when said cover is closed and swung to a position where said cover overlaps with said main unit, covers an area of an end portion of said main unit opposed to said axis, said area extending from an upper face to a side face.

2. The mobile information terminal according to claim 1, wherein said end portion of said main unit opposed to said light-introducing portion is formed as a face inclined with respect to a bottom face of said main unit, and said light-introducing portion has a shape corresponding to said inclined face.

3. The mobile information terminal according to claim 1, further comprising:
   a lock mechanism for fixing said main unit and said cover together when said cover is closed.

4. The mobile information terminal according to claim 3, wherein said lock mechanism comprises:
   a knob portion disposed on said main unit;
   a hook portion disposed on said main unit;
   a hook hole formed in said cover.

5. The mobile information terminal according to claim 3, wherein said lock mechanism is disposed in both side edge portions of said mobile information terminal.

6. A mobile information terminal comprising: a main unit;
   a liquid crystal panel;
   a light-introducing portion for introducing external light to illuminate said liquid crystal panel; and
   a movable cover connected to said main unit by at least one axis,
   wherein said light-introducing portion is disposed in an end portion opposed to said axis, and a length of said cover between said light-introducing portion and said axis is longer than a length of said main unit between an end portion opposed to said light-introducing portion and said axis, and
   wherein a thickness of said cover in a position of said light-introducing portion is larger than a thickness of said cover in a position of said liquid crystal panel,
   wherein an inclined face is disposed in said end portion of said main unit opposed to said axis and an overlapping portion which corresponds to an inclined face of said cover is used as a light guide plate.

7. The mobile information terminal according to claim 6, wherein said end portion of said main unit opposed to said light-introducing portion is formed as a face inclined with respect to a bottom face of said main unit, and said light-introducing portion has a shape corresponding to said inclined face.

8. The mobile information terminal according to claim 6, further comprising:
   a lock mechanism for fixing said main unit and said cover together when said cover is closed.

9. The mobile information terminal according to claim 8, wherein said lock mechanism comprises:
   a knob portion disposed on said main unit;
   a hook portion disposed on said main unit;
   a hook hole formed in said cover.

10. The mobile information terminal according to claim 8, wherein said lock mechanism is disposed in both side edge portions of said mobile information terminal.

11. A mobile information terminal having a cover comprising:
    a main unit;
    a liquid crystal panel;
    a light-introducing portion for introducing external light from one end to illuminate said liquid crystal panel; and
    a movable cover connected to said main unit by at least one axis,
    wherein an end portion of said cover including said light-introducing portion has a shape which covers an end portion of said main unit opposed to said axis and extending from an upper face to a side face.

12. The mobile information terminal according to claim 11, wherein said end portion of said main unit opposed to said light-introducing portion is formed as a face inclined with respect to a bottom face of said main unit, and said light-introducing portion has a shape corresponding to said inclined face.

13. The mobile information terminal according to claim 11, further comprising:

a lock mechanism for fixing said main unit and said cover together when said cover is closed.

14. The mobile information terminal according to claim 13, wherein said lock mechanism comprises:

a knob portion disposed on said main unit;

a hook portion disposed on said main unit;

a hook hole formed in said cover.

15. The mobile information terminal according to claim 13, wherein said lock mechanism is disposed in both side edge portions of said mobile information terminal.

* * * * *